United States Patent
Ota

(10) Patent No.: US 12,503,402 B2
(45) Date of Patent: Dec. 23, 2025

(54) CERAMIC JOINT BODY, METHOD FOR MANUFACTURING CERAMIC JOINT BODY, STATOR FOR FLOW CHANNEL SWITCHING VALVE, AND FLOW CHANNEL SWITCHING VALVE

(71) Applicant: KYOCERA CORPORATION, Kyoto (JP)

(72) Inventor: Shoichi Ota, Higashiomi (JP)

(73) Assignee: KYOCERA Corporation, Kyoto (JP)

( * ) Notice: Subject to any disclaimer, the term of this patent is extended or adjusted under 35 U.S.C. 154(b) by 677 days.

(21) Appl. No.: 17/791,695

(22) PCT Filed: Jan. 6, 2021

(86) PCT No.: PCT/JP2021/000248
§ 371 (c)(1),
(2) Date: Jul. 8, 2022

(87) PCT Pub. No.: WO2021/141056
PCT Pub. Date: Jul. 15, 2021

(65) Prior Publication Data
US 2023/0034636 A1 Feb. 2, 2023

(30) Foreign Application Priority Data
Jan. 10, 2020 (JP) .................. 2020-002905

(51) Int. Cl.
C04B 35/488 (2006.01)
C04B 37/00 (2006.01)
(Continued)

(52) U.S. Cl.
CPC .......... *C04B 35/4885* (2013.01); *C04B 37/00* (2013.01); *C04B 37/001* (2013.01);
(Continued)

(58) Field of Classification Search
None
See application file for complete search history.

(56) References Cited

U.S. PATENT DOCUMENTS

2001/0054443 A1* 12/2001 Niwa ............... F16C 33/32
137/533.11
2002/0029837 A1* 3/2002 Arishiro ............ H05K 3/00
156/89.12

(Continued)

FOREIGN PATENT DOCUMENTS

WO 2009/101695 A1 8/2009

*Primary Examiner* — Clare M Perrin
(74) *Attorney, Agent, or Firm* — Procopio, Cory, Hargreaves & Savitch LLP

(57) ABSTRACT

The ceramic joint body according to the present disclosure includes: a first member made of ceramic and including a first flow channel configured to feed fluid; and a second member made of ceramic and including a second flow channel connected to the first flow channel to feed the fluid. The ceramic includes zirconium oxide and aluminum oxide, and at least one of the zirconium oxide and the aluminum oxide is a primary constituent, and a first opposing surface of the first member, which faces the second member, and a second opposing surface of the second member, which faces the first member, are connected by diffusion bonding.

13 Claims, 3 Drawing Sheets

(51) Int. Cl.
*F16K 3/08* (2006.01)
*G01N 30/20* (2006.01)
*G01N 30/22* (2006.01)
*G01N 30/24* (2006.01)

(52) U.S. Cl.
CPC ........ *F16K 3/08* (2013.01); *C04B 2235/3232* (2013.01); *C04B 2237/343* (2013.01); *C04B 2237/348* (2013.01); *C04B 2237/52* (2013.01); *C04B 2237/62* (2013.01); *G01N 30/20* (2013.01); *G01N 2030/201* (2013.01); *G01N 2030/202* (2013.01); *G01N 30/22* (2013.01); *G01N 30/24* (2013.01)

(56) References Cited

U.S. PATENT DOCUMENTS

| | | | | |
|---|---|---|---|---|
| 2009/0321356 | A1* | 12/2009 | Gerhardt | G01N 30/606 |
| | | | | 210/253 |
| 2010/0276617 | A1 | 11/2010 | Yasunaga | |
| 2010/0327537 | A1 | 12/2010 | Johnson et al. | |
| 2018/0164259 | A1* | 6/2018 | Liu | B01D 15/22 |

* cited by examiner

CERAMIC JOINT BODY, METHOD FOR MANUFACTURING CERAMIC JOINT BODY, STATOR FOR FLOW CHANNEL SWITCHING VALVE, AND FLOW CHANNEL SWITCHING VALVE

TECHNICAL FIELD

The present disclosure relates to a ceramic joint body, a method for manufacturing a ceramic joint body, a stator for a flow channel switching valve, and a flow channel switching valve.

BACKGROUND ART

A high-performance liquid chromatograph includes a mechanism using a flow channel switching valve that switches flow channels to introduce a sample solution under the atmospheric pressure into the flow channel though which mobile phases are transported under a high pressure (several tens of MPa).

Such a flow channel switching valve includes a stator and a rotor that are in contact with each other via a contact plane, and the rotor is required to have high durability. In Patent Document 1, in order to enhance durability of a rotor, a flow channel switching valve is provided that includes: a stator having circulation openings on the contact plane, the circulation openings being respectively in communication with a housing to which a plurality of flow channels are connected; and a rotor having at least one groove for communicating two of the circulation openings of the stator on the contact plane, the rotor being pressed against the contact plane of the stator to rotationally slide so as to switch the circulation openings of the stator that need to be communicated. In the flow channel switching valve, the contact plane of the stator is obtained by polishing a base member of the stator, forming a coating film with diamond like carbon (DLC), and then polishing the coating film. In addition, the stator is made of stainless steel, and a plurality of flow channel connecting portions are disposed in the stator. A liquid transportation device for transporting mobile phases, a sample loop for measuring sample solutions, a column for separating sample solutions according to each ingredient, or the like is connected to each of the flow channel connecting portions, Front ends of the flow channel connecting portions are in communication with through holes on the contact plane.

CITATION LIST

Patent Literature

Patent Document 1: International Publication WO 2009/101695

SUMMARY

A ceramic joint body of the present disclosure includes: a first member made of ceramic and including a first flow channel configured to feed fluid; and a second member made of ceramic and including a second flow channel connected to the first flow channel to feed the fluid. The ceramic includes zirconium oxide and aluminum oxide, and at least one of the zirconium oxide and the aluminum oxide is a primary constituent, and a first opposing surface of the first member, which faces the second member, and a second opposing surface of the second member, which faces the first member, are connected by diffusion bonding.

A method for manufacturing a ceramic joint of the present disclosure is a method for manufacturing a ceramic joint body that includes a first member made of ceramic and including a first flow channel configured to feed fluid, and a second member made of ceramic and including a second flow channel connected to the first flow channel to feed the fluid. The method includes: forming a plurality of pin insertion holes that each extend through a first compact and a second compact as precursors of the first member and the second member before burning; burning the first member and the second member; bonding a first opposing surface of the first member to a second opposing surface of the second member, the first opposing surface facing the second member, the second opposing surface facing the first member; inserting pins for positioning into the plurality of pin insertion holes; and pressing the first member and the second member in a thickness direction after the bonding, and applying thermal treatment to the first member and the second member.

DESCRIPTION OF EMBODIMENTS

A ceramic joint body, a stator, and a flow channel switching valve of an embodiment of the present disclosure will be described below in detail with reference to the drawings.

Figure 1:
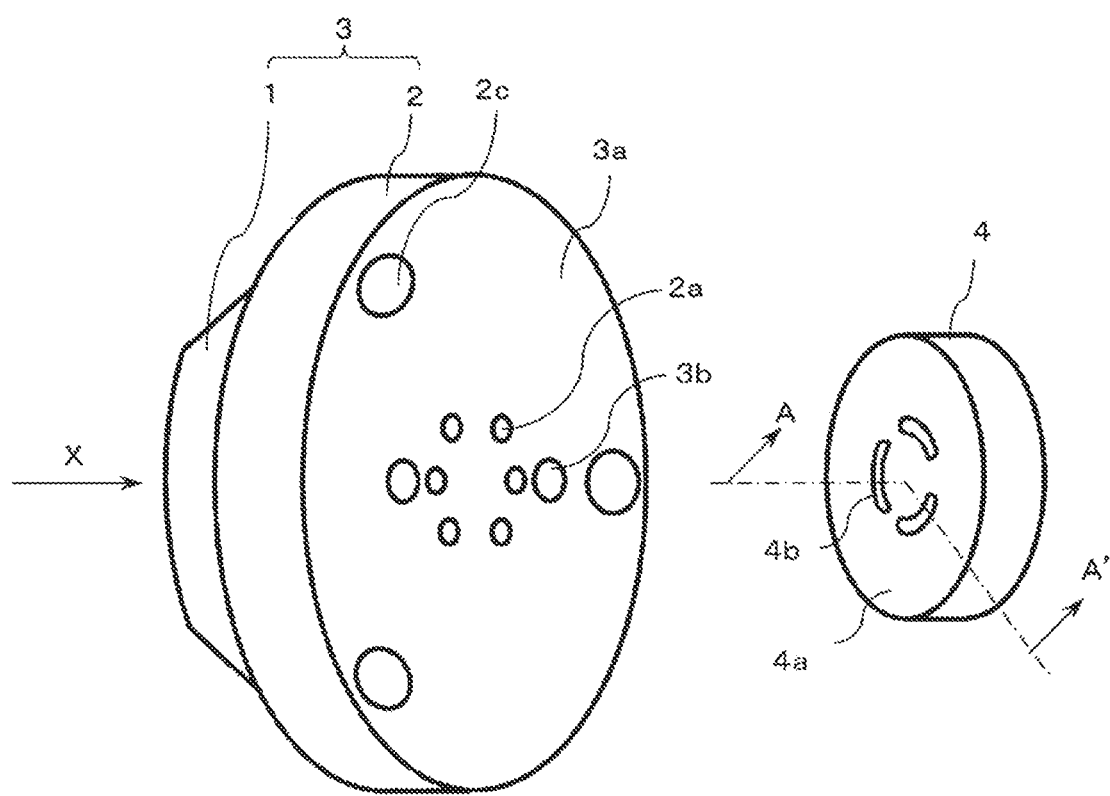
FIG. 1 is a perspective view illustrating an example of a stator and a rotor that are included in a flow channel switching valve using a ceramic joint body according to an embodiment of the present disclosure.
Figure 2:
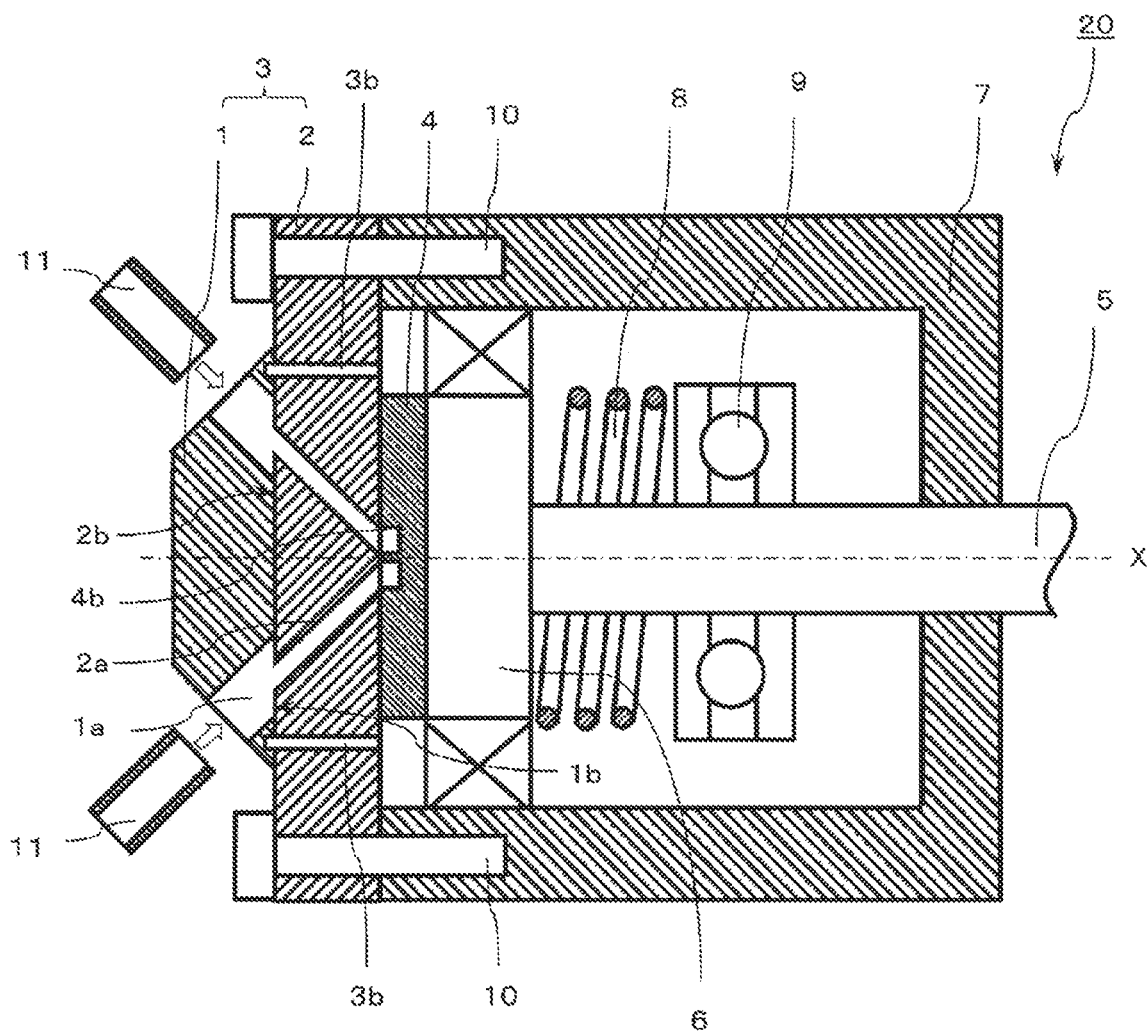
FIG. 2 is a cross-sectional view of the flow channel switching valve taken along line A-A' of the rotor illustrated in FIG. 1.
Figure 3:
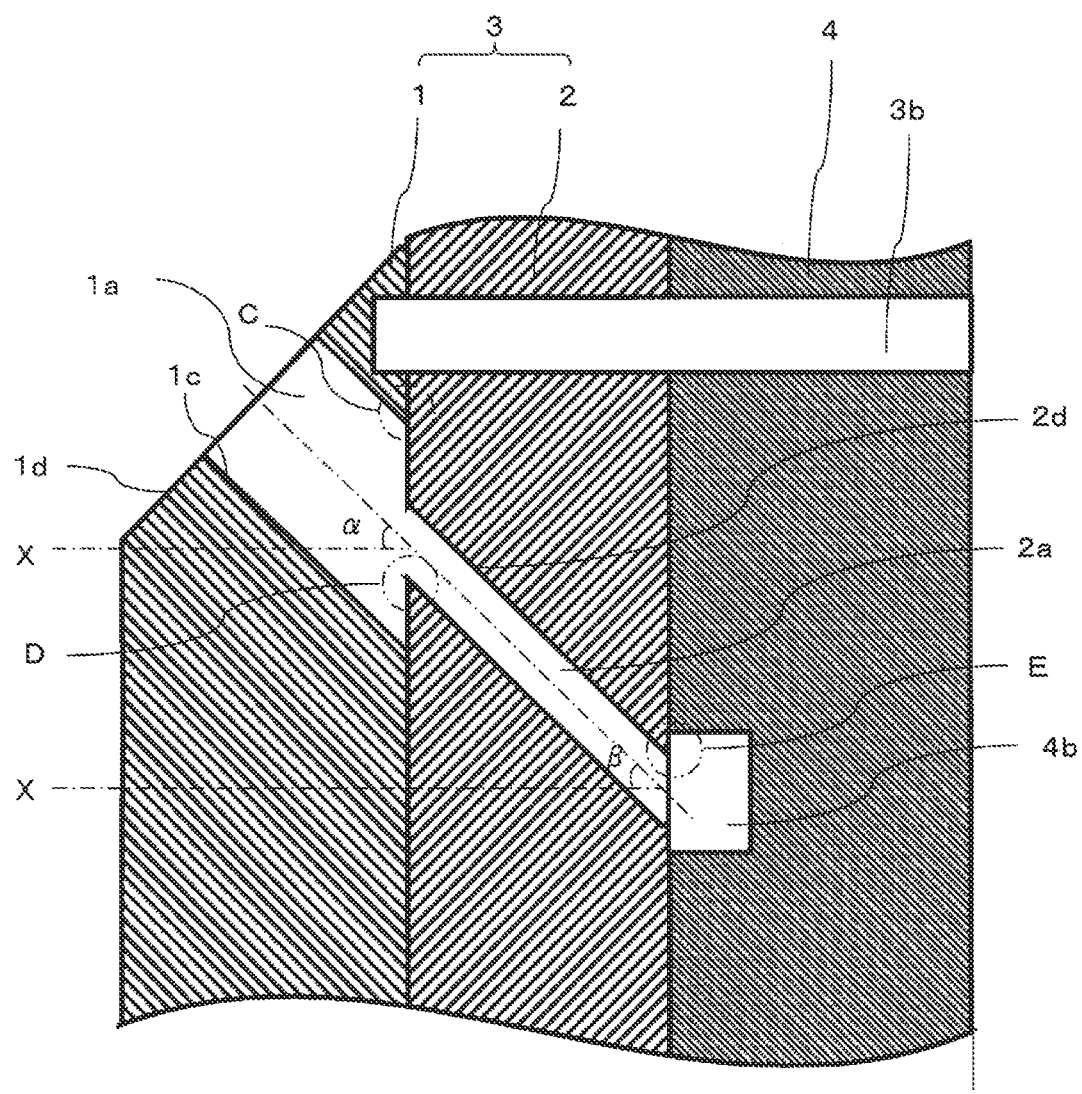
FIG. 3 is an enlarged cross-sectional view of a connecting portion of a flow channel of the flow channel switching valve illustrated in FIG. 2.

FIG. 1 is a perspective view illustrating an example of a stator and a rotor that are included in a flow channel switching valve using a ceramic joint body according to an embodiment of the present disclosure. FIG. 2 is a cross-sectional view of the flow channel switching valve taken along line A-A' of the rotor illustrated in FIG. 1. FIG. 3 is an enlarged cross-sectional view of a connecting portion of a flow channel of the flow channel switching valve illustrated in FIG. 2.

As illustrated in FIGS. 1 and 2, a flow channel switching valve 20 illustrated in FIG. 2 includes a stator 3 and a rotor 4 that rotates while making contact with the stator 3 to switch flow channels.

The stator 3 includes a ceramic joint body that includes a first member 1 made of ceramic and including first flow channels 1a for sending fluid, and a second member 2 made of ceramic and including second flow channels 2a that are connected to the first flow channels 1a to send the fluid. The first member 1 has a disk-shape, and a plurality of the first flow channels 1a are disposed on a circle. In addition, the cross-section perpendicular to an axial center X of the first member 1 is an isosceles trapezoid shape that has oblique sides and widens toward the second member 2.

The second member 2 has a disk-shape. A plurality of the second flow channels 2a are disposed on a circle (six second flow channels in the example illustrated in FIG. 1), and a diameter of the second flow channel 2a is smaller than a diameter of the first flow channel 1a. A sliding surface 3a of the stator 3 is in contact with a sliding surface 4a of the rotor 4. The second flow channels 2a are connected coaxially with the first flow channels 1a. The second flow channels 2a are inclined with respect to the axial center X and opened toward a plurality of circular arc-shaped grooves 4b provided on the sliding surface 4a. The angle formed by the second flow channel 2a and the axial center X is, for example, from 35° to 45°.

In the stator 3 illustrated in FIG. 3, the first flow channel 1a and the second flow channel 2a are coaxially positioned and an angle a formed by the first flow channel 1a and the axial center X and an angle β formed by the second flow channel 2a and the axial center X are equal; however, the angle α and the angle β may be different. Additionally, the second flow channels 2a may be inclined to the axial center X, and the first flow channels 1a may be arranged parallel to the axial center X.

The first member 1 and the second member 2 include a plurality of pin insertion holes 3b on a circle, the pin insertion holes 3b each extending through both the first member 1 and the second member 2 in parallel to the axial center X. The pin insertion hole 3b is used to insert therein a pin (not illustrated) before the first member 1 and the second member 2 are connected, and the pin insertion hole 3b is used to position the first member 1 and the second member 2. After the first member 1 and the second member 2 are connected, the pin is removed from the pin insertion hole 3b.

The rotor 4 is made of, for example, a thermoplastic resin such as polyetheretherketone.

The rotor 4 is held by a rotor holding portion 6 attached to a tip of a shaft 5, and is pressed toward the stator 3 by an elastic member 8 provided inside a frame body 7 that houses the rotor 4. The shaft 5 is rotatably supported by a bearing 9. Bolts 10 are mounted into bolt mounting holes 2c, and thus the frame body 7 is fastened to the outer peripheral part of the stator 3.

At the time of changing the combination of the second flow channels 2a with respect to the groove 4b, the shaft 5 is rotated, and thereby the rotor 4 is rotated relative to the stator 3. Thus, the connection of the second flow channels 2a with the groove 4b is switched.

In a case where the flow channel switching valve 20 is used for liquid chromatography, a liquid transportation device for transporting mobile phases, a sample loop for measuring sample solutions, a column for separating sample solutions according to each ingredient, or the like is connected to the first flow channels 1a via pipes 11 made of metal. The mobile phase is a medium for separating a sample and is, for example, a strong acid aqueous solvent such as phosphoric acid (sodium) buffer solution (pH 2.5) or sodium dihydrogen phosphate buffer solution (pH 2.5), a strong alkaline aqueous solvent such as trimethylamine, an organic solvent, or a mixture thereof.

Ceramic constituting the ceramic joint body used in such a flow channel switching valve 20 includes zirconium oxide and aluminum oxide, and at least one of the oxides is a primary constituent. A first opposing surface 1b of the first member 1, which faces the second member 2, and a second opposing surface 2b of the second member 2, which faces the first member 1, are connected by diffusion boding.

Such a configuration can prevent granules falling off from acute-angled portions C, D, E even when at least one of the first flow channel 1a and the second flow channel 2a is inclined with respect to the axial center X, and the mechanical strength of the ceramic joint body can be increased.

Further, the first member 1 and the second member 2 include aluminum oxide, and thus the bonding strength can be increased. Furthermore, even when the crystalline structure of zirconium oxide before diffusion bonding is of tetragonal crystals, the tetragonal crystals are less likely to undergo phase transformation to monoclinic crystals during temperature dropping at diffusion bonding. Therefore, the generation of micro-cracks is suppressed at each surface of the ceramic joint body, and the mechanical strength is maintained even after diffusion bonding.

In the present disclosure, a primary constituent refers to a constituent that accounts for 70 mass % or more of 100 mass % of constituents forming the ceramic.

The constituents of the ceramic can be identified by using an X-ray diffractometer (XRD), and the contents can be determined by Rietveld refinement. Additionally, the contents may be determined by converting the metal elements obtained by a fluorescent X-ray analysis (XRF) or an inductively coupled plasma (ICP) emission spectrophotometer into the identified constituents.

In the present disclosure, the diffusion bonded state is a bonded state without a bonding layer made of glass or resin. By using the first member 1 and the second member 2, the opposing surfaces thereof are in contact with each other, and thus corrosion resistance to the mobile phase is increased. In addition, sealing performance between the opposing surfaces is increased. Therefore, even when delivery and discharging of the mobile phase are repeated, a long term usage can be achieved.

The sum of a $ZrO_2$ conversion value of Zr and an $Al_2O_3$ conversion value of Al is 80 mass % or more of 100 mass % of all of the constituents forming the ceramic, and a mass ratio of the $ZrO_2$ conversion value to the $Al_2O_3$ conversion value may be 97:3 to 50:50.

Aluminum oxide has higher thermal conductivity than zirconium oxide, and zirconium oxide has higher mechanical strength than aluminum oxide.

When the ratio of the $ZrO_2$ conversion value and the $Al_2O_3$ conversion value of the constituents of the ceramic is in the range described above, both high thermal conductivity and high mechanical strength can be provided.

When the sum of the $ZrO_2$ conversion value of Zr and the $Al_2O_3$ conversion value of Al is in the range described above and the mass ratio of the $ZrO_2$ conversion value to the $Al_2O_3$ conversion value is 97:3 to 50:50, it is preferable that a stabilizing agent is contained and the stabilizing agent is a compound including yttrium (Y). MgO, CaO, $CeO_2$, or the like may be used as the stabilizing agent; however, in order to maintain the crystalline structure of the ceramic in stable cubical crystals or tetragonal crystals at an ambient temperature and improve mechanical characteristics, a compound including yttrium (Y) is preferably used as the stabilizing agent.

Here, the compound that can stabilize the crystalline structure of the ceramic and improve mechanical characteristics includes yttrium oxide ($Y_2O_3$), yttrium nitrate hexahydrate ($Y(NO_3)_3 \cdot 6H_2O$), yttrium chloride hexahydrate ($YCl_3 \cdot 6H_2O$), yttrium acetate trihydrate ($YCH_3COO)_3 \cdot 3H_2O$), or the like. Also, $YAlO_3$(YAP), $Y_3Al_5O_{12}$(YAG), $Y_4Al_5O_9$(YAM), or the like that is a compound of yttrium (Y) and aluminum (Al) can also be used.

Aluminum oxide is also a colorant agent that exhibits white color. In particular, when the sum of the $ZrO_2$ conversion value of Zr and the $Al_2O_3$ conversion value of Al is in the range described above and the mass ratio of the $ZrO_2$ conversion value to the $Al_2O_3$ conversion value is 97:3 to 95:5, the color tone exhibited by the ceramic joint body can be white color with full of cleanliness. Therefore, aluminum oxide may be used as a part of instruments that require cleanliness, for example, medical instruments. When the mass ratio of the $ZrO_2$ conversion value to the $Al_2O_3$ conversion value is 97:3 to 95:5, three-point bending strength of each of the first member 1 and the second member 2 can be increased to 900 MPa or more. The three-point bending strength may be measured in accordance with JIS R 1601:2008.

The ceramic joint body can have a surface exhibiting white in which the lightness factor L* in the CIE 1976 L*a*b* color space is from 83 to 87, the psychometric chroma coordinate a* is from −1.5 to 1.5, and the psychometric chroma coordinate b* is from −2.0 to 3.0. The lightness factor L*, the psychometric chroma coordinate a*, and the psychometric chroma coordinate b* of the surface within such ranges enables easy recognition of dirt even when dark-colored dirt contained in fluid is adhered to the surface, and components can be replaced with appropriate frequency.

The values of the lightness factor L*, the psychometric chroma coordinate a*, and the psychometric chroma coordinate b* in the CIE 1976 L*a*b* color space of the surface may be measured in accordance with JIS Z 8722:2000. For example, by using a chromatic colorimeter (CR-221 available from formerly Minolta Corporation), the values can be measured under the condition where the reference light source is D65, the illumination receiving method is condition a((45−n)[45−0]), and the measurement diameter is 3 mm. In a case where a sufficient measurement diameter cannot be ensured, the values can be measured by polishing an arbitrary location and then setting the above conditions.

Preferably, at least one of the first member 1 and the second member 2 includes at least one of Fe, Cr, and/or Ni, and the total content of the metal in each of the members is from 25 mass ppm to 100 mass ppm.

When the member includes at least one of Fe, Cr, and/or Ni and the total amount of the metal in each member is 25 mass ppm or more, these ferromagnetic metals can be removed easily in an iron removing process of each member. When the total content of Fe, Cr, and/or Ni is 100 mass ppm or less, metal is less likely to flow into between the first opposing surface 1b and the second opposing surface 2b in a bonding process of bonding the first member 1 and the second member 2, and thus the bonding strength therebetween can be increased more. Abnormality in the color is less likely to occur locally on the surface of the ceramic joint body.

The total reflectivity of at least either of the surfaces to visible light may be 80% or more.

When the total reflectivity to visible light is 80% or more, white color with moderate brightness and full of cleanliness can be provided. Therefore, even when dark-colored dirt contained in fluid is adhered to the surface, the dirt can be more easily recognized, and the sensitivity to component replacement can be improved.

The visible light in the present disclosure refers to a light ray at a wavelength of 360 nm to 740 nm.

The total reflectivity can be measured in accordance with JIS Z 8722:2000 by using a spectrophotometric colorimeter (such as CM-3700d available from KONICA MINOLTA, INC.) under the condition where the reference light source is D65, the wavelength range is 360 nm to 740 nm, and the viewing angle is 10° and by using a mask (LAV) having a measurement diameter of 25.4 mm and an irradiation diameter of 28 mm.

The maximum diameter of each of open pores in a first inner wall surface 1c forming the first flow channel 1a may be 6 µm or less.

When determining the maximum diameter of the open pore, a photograph of the surface of the first inner wall surface 1c is firstly taken with a metallurgical microscope at 100-fold magnification. Next, the photograph is imaged with a CCD camera, and open pores in $9 \times 10^{-2}$ mm$^2$ in the image are observed. Then, an outer diameter of the largest open pore is calculated from the image. In addition, this is assumed to be one field of view, and observation is performed in a total of ten field of views including other observation sites. From the observation results in the ten field of views, the outer diameter of the largest open pore may be assumed to be the maximum diameter of the open pore.

The first inner wall surface 1c forming the first flow channel 1a may be a polished surface.

When the first inner wall surface 1c is a polished surface, the surface can be sufficiently controlled in terms of geometric tolerances such as cylindricity, roundness, or the like of the first flow channel, and mounting of the pipe 11 is facilitated. The flow channel switching valve 20 in the example illustrated in FIG. 1 can also control perpendicularity with respect to a surface that is inclined (hereinafter, a surface that is inclined will be referred to as an inclined surface) 1d, and the pipe 11 can be inserted perpendicular to the inclined surface 1d.

The first inner wall surface 1c may have an arithmetic mean roughness (Ra) of 0.2 µm or less on the roughness curve. At the time of mounting the pipe 11, the outer peripheral surface of the pipe 11 comes into contact with the first inner wall surface 1c, which easily causes falling of granules of metal; however, when the arithmetic mean roughness (Ra) is set within the range described above, falling-off of granules can be suppressed. In particular, the arithmetic mean roughness (Ra) is preferably 0.1 µm or less.

The first inner wall surface 1c may be configured such that a cutting level difference (Rδc) is 0.3 µm, where Rδc indicates a difference between the cutting level at a load length ratio of 25% on the roughness curve and the cutting level at a load length ratio of 75% on the roughness curve.

When the cutting level difference (Rδc) is within the range described above, the steepness of protruding portions on the first inner wall surface 1c is suppressed, and thus falling of granules that is likely to occur from the tip end of the protruding portions can be suppressed.

The arithmetic mean roughness (Ra) and the cut level difference (Rδc) between the load length ratio of 25% and the load length ratio of 75% on the roughness curve can be measured in accordance with JIS B 0601:2001 by using a laser microscope (an ultra-deep color 3D shape measurement microscope (VK-X1000 or successor models thereof) available from Keyence Corporation). The following measurement conditions are preferably provided in which four lines as four measurement targets are drawn in a single measurement area of 1404 µm×1053 µm from the first inner wall surface 1c so as to be disposed at approximately equal intervals in the longitudinal direction in each measurement area by a coaxial vertical illumination method, at 240-fold measurement magnification, without a cutoff value λs, and with a cutoff value λc of 0.08 mm.

A second inner wall surface 2c forming the second flow channel 2a may be a burned surface.

The second inner wall surface 2c being a burned surface can prevent granules from falling off from the second inner wall surface 2c even when the second inner wall surface 2c is exposed directly to a high-pressure mobile phase, because the second inner wall surface 2c has no fractured layer due to grinding or polishing.

In the example illustrated in FIG. 1, the six second flow channels 2a are disposed on a circle, and the groove 4b communicates with the two second flow channels 2a of the six second flow channels 2a; however, the flow channel switching valve 20 of the present disclosure can also be applied as a flow channel switching valve called a multi-position valve. In the multi-position valve, a common flow channel that communicates as a first flow channel and a second flow channel of a stator along the axial center is provided. A plurality of the first flow channels and a plurality of the second flow channels that connect to the first flow channels are disposed around the common flow channel. Grooves of a rotor are each a groove extending radially to allow the common flow channel of the stator to selectively connect to any of the second flow channels disposed on a circle.

The aforementioned flow channel switching valve according to the present disclosure can he used in an analytical instrument or another instrument that requires switching of flow channels.

Next, an example of a method for manufacturing the ceramic joint body of the present disclosure will be described.

To obtain ceramic constituting the ceramic joint body of the present disclosure, Aluminum oxide in a range from 0.3 mass % to 5.0 mass % is firstly added and mixed into zirconium oxide of 100 mass % produced by a coprecipitation method in which yttrium oxide is added as the stabilizing agent in an amount of 1 mol % or more and below 3 mol %, and ion-exchanged water as a solvent is added into the mixed raw material. Then, the mixed raw material is mixed and ground by vibrating milling, ball milling, or the like.

Here, the average grain size of zirconium oxide to be the raw material is preferably 0.05 μm or more and below 0.5 μm, and the average grain size of aluminum oxide is preferably from 0.5 μm to 2.0 μm. As just described, the average grain size of aluminum oxide is set to be larger than the average grain size of zirconium oxide. Thus, at the time of mixing and grinding, the aggregation of zirconium oxide can be prevented by disintegration action of the aluminum oxide having the large average grain size. The ceramic obtained by forming and burning with such a raw material is excellent in dispersibility of aluminum oxide, and the density is increased.

Examples of an applicable ball used for mixing and grinding include a white ceramic ball including zirconium oxide, a white ceramic ball including aluminum oxide, or a white ceramic ball including zirconium oxide and aluminum oxide. Examples of the white ceramic balls include a ball including 91 to 99 mol % of zirconium oxide ($ZrO_2$) having a purity of 99.5 mass % or more, and 1 to 9 mol % of at least one type of stabilizing agent selected from yttrium oxide ($Y_2O_3$), hafnium oxide ($HO_2$), cerium oxide ($CeO_2$), magnesium oxide (MgO). and calcium oxide (CaO), a ball obtained by further adding, into the ball of such a composition, 1 to 40 mass % of aluminum oxide ($Al_2O_3$) having a purity of 99.5 mass % or more, or a ball consisted only of aluminum oxide having a purity of 99.5 mass % or more.

Next, a predetermined amount of various binders as a binding agent is added into the mixed and ground raw material, and the resultant is dried by a spray dry method to form granules. Then, the obtained granules are used to obtain a disk-shaped compact by using a desired forming method, for example, dry pressing, cold isostatic pressing, or the like. Here, forming pressure may be preferably from 49 MPa to 245 MPa. in order to obtain the ceramic joint body where the open pore in the first inner wall surface forming the first flow channel has a maximum diameter of 6 μm or less, the forming pressure may be preferably from 196 MPa to 245 MPa. Then, pilot holes that form first flow channels and pin insertion holes after burning are prepared in the obtained compact to obtain a first compact. Also, pilot holes that form second flow channels, insertion holes, and bolt mounting holes after burning are prepared in the obtained compact to obtain a second compact.

The first compact and the second compact are degreased as necessary and thereafter are burned at a temperature from 1350° C. to 1550° C. in the atmosphere, and the first compact and the second compact form the first member and the second member, respectively.

Additionally, to obtain another ceramic constituting the ceramic joint body of the present disclosure, the manufacturing method described below may be used.

First, aluminum oxide powder, zirconium oxide powder made by a coprecipitation method in which yttrium oxide is added as the stabilizing agent in an amount from 1 mol % to 5 mol %, titanium oxide ($TiO_2$) powder as a sintering aid, magnesium hydroxide ($Mg(OH)_2$) powder, and silicon oxide ($SiO_2$) powder are prepared.

Additionally, in weighing, the powders are weighed in such a manner that the sum of a $ZrO_2$ conversion value of Zr and an $Al_2O_3$ conversion value of Al is 80 mass % or more of 100 mass % of all of the constituents forming the ceramic and a mass ratio of the $ZrO_2$ conversion value to the $Al_2O_3$ conversion value is 97:3 to 50:50.

Next, the sintering aid is weighed in such a manner that the amount of the sintering aid is 0.1 part by mass or more and 2.0 parts by mass or less with respect to 100 parts by mass of a total of the weighed aluminum oxide powder and zirconium oxide powder.

The aluminum oxide powder, the zirconium oxide powder, and the sintering aid are mixed, and ion-exchanged water as a solvent is added into the mixed raw material. Then, the mixed raw material is mixed and ground by vibrating milling, ball milling, or the like.

Here, the average grain size of zirconium oxide to be the raw material is preferably 0.05 μm or more and below 0.5 μm, and the average grain size of aluminum oxide is preferably from 0.5 μm to 2.0 μm.

In addition, any of the aforementioned balls may be applied as a ball used for mixing and grinding.

Then, granulation, forming, and pilot hole forming are performed in the same manner as the manufacturing method described above to obtain the first compact and the second compact.

The first compact and the second compact are degreased as necessary and thereafter are held at a temperature from 1475° C. to 1600° C. in the atmosphere for 0.5 hours to three hours to obtain the first member and the second member.

In the ceramic obtained by any of the manufacturing methods, a honing process may be applied to the inner wall surface of the first flow channel of the first member to form the first inner wall surface.

Machining may be applied to the inner wall surface of the bolt mounting hole of the second member.

Then, at least one of the first opposing surface of the first member, which faces the second member, and the second opposing surface of the second member, which faces the first member, is polished by using diamond abrasive grains each having an average grain size $D_{50}$ of, for example, 2 μm or less, and water may be adhered to (e.g., water droplets may be sprayed over) at least one of the first opposing surface and the second opposing surface. The adhered water allows the first opposing surface and the second opposing surface to be firmly attached by surface tension. In addition, elements (Si, Mg, Ca) other than Al, which are induced by hydration (local hydrolysis reaction of OH-group with $H_2O$ having less impurities) are recrystallized due to the difference in electronegativity; therefore, a strong bond can be obtained.

Further, the sliding surface 3a of the stator 3 is preferably polished by diamond abrasive grains each having the average grain size $D_{50}$ of, for example, 1 μm or more and 3 μm or less to form a mirrored surface.

Then, the first opposing surface and the second opposing surface are bonded and thereafter pressed in the thickness direction to be thermally treated. Therefore, the ceramic joint body of the present disclosure can be obtained. The temperature of the thermal treatment is, for example, from 1000° C. to 1800° C., and in particular, is preferably from 1400° C. to 1800° C. The thermal treatment time is, for example, from 30 minutes to 120 minutes. Furthermore, pressure required for the pressing force is not limited, and is set appropriately in accordance with the size or material of the first member 1 or the second member 2. Specifically, it is preferable to apply a pressure of approximately 1kgf to 5 kgf.

In order to obtain the first inner wall surface having an arithmetic mean roughness (Ra) of 0.2 μm or less on the roughness curve, for example, after the bonding, polishing may be performed by using diamond abrasive grains each having the average grain size $D_{50}$, for example, from 1 μm to 3 μm.

Additionally, in order to obtain the first inner wall surface in which a cutting level difference (Rδc) is 0.3 μm or less that indicates a difference between the cutting level at a load length ratio of 25% on the roughness curve and the cutting level at a load length ratio of 75% on the roughness curve, for example, polishing may be performed by using diamond abrasive grains each having the average grain size $D_{50}$, for example, from 1 μm to 2 μm.

Even when an angle formed by the flow channel and the opposing surface or an angle formed by the flow channel and the sliding surface is an acute angle, the ceramic joint body obtained by the manufacturing method described above can prevent granules from falling off from the acute-angled portion, and can enhance mechanical strength and bonding strength of the ceramic joint body. In addition, the stator using such a joint body provides improved reliability and thus can be used for a long period of time.

REFERENCE SIGNS LIST

1 First member
2 Second member
3 Stator
4 Rotor
5 Shaft
6 Rotor holding portion
7 Frame body
8 Elastic member
9 Bearing
10 Bolt
11 Pipe
20 Flow channel switching valve

The invention claimed is:

1. A ceramic joint body, comprising:
a first member made of ceramic and comprising a first flow channel configured to feed fluid; and
a second member made of ceramic and comprising a second flow channel connected to the first flow channel to feed the fluid;
wherein the first member has a cross section that widens toward the second member,
wherein the ceramic comprises zirconium oxide and aluminum oxide and at least one of the zirconium oxide and the aluminum oxide is a primary constituent, and
a first opposing surface of the first member and a second opposing surface of the second member are directly connected by diffusion bonding, the first opposing surface facing the second member, the second opposing surface facing the first member.

2. The ceramic joint body according to claim 1, wherein the sum of a $ZrO_2$ conversion value of Zr and an $Al_2O_3$ conversion value of Al is 80 mass % or more of 100 mass % of all constituents forming the ceramic, and
a mass ratio of the $ZrO_2$ conversion value to the $Al_2O_3$ conversion value is 97:3 to 50:50.

3. The ceramic joint body according to claim 2, wherein at least one of the first member and the second member comprises at least one of Fe, Cr, and/or Ni, and
the total content of Fe, Cr and Ni in each of the first member and the second member is from 25 mass ppm to 100 mass ppm.

4. The ceramic joint body according to claim 1, wherein at least one surface of the ceramic joint body has a lightness factor L* from 83 to 87,
a psychometric chroma coordinate a* from −1.5 to 1.5, and
a psychometric chroma coordinate b* from −2.0 to 3.0 in a CIE 1976 L*a*b* color space.

5. The ceramic joint body according to claim 1, wherein a total reflectivity of at least one surface of the ceramic joint body to visible light is 80% or more.

6. The ceramic joint body according to claim 1, wherein a first inner wall surface forming the first flow channel is a polished surface.

7. The ceramic joint body according to claim 1, wherein a first inner wall surface forming the first flow channel has an arithmetic mean roughness (Ra) of 0.2 μm or less on a roughness curve.

8. The ceramic joint body according to claim 1, wherein a first inner wall surface forming the first flow channel has a cutting level difference (Rδc) of 0.3 μm or less, the cutting level difference indicating a difference between a cutting level at a load length ratio of 25% on a roughness curve and a cutting level at a load length ratio of 75% on the roughness curve.

9. The ceramic joint body according to claim 1, wherein a first inner wall surface forming the first flow channel has open pores each having a maximum diameter of 6 μm or less.

10. The ceramic joint body according to claim 1, wherein a second inner wall surface forming the second flow channel is a burned surface.

11. A stator comprising the ceramic joint body according to claim 1.

12. A flow channel switching valve comprising the stator according to claim 11 and a rotor configured to rotate while making contact with the stator to switch flow channels.

13. A method for manufacturing a ceramic joint body that comprises a first member made of ceramic having a first flow channel configured to feed fluid, and a second member made of ceramic having a second flow channel connected to the first flow channel to feed the fluid, the first member having a cross section that widens toward the second member, the method comprising:
- forming a plurality of pin insertion holes that each extend through a first compact and a second compact as precursors of the first member and the second member before burning;
- burning the first member and the second member;
- bonding a first opposing surface of the first member directly to a second opposing surface of the second member, the first opposing surface facing the second member, the second opposing surface facing the first member;
- inserting pins for positioning into the plurality of pin insertion holes; and
- pressing the first member and the second member in a thickness direction after the bonding, and applying thermal treatment to the first member and the second member.

* * * * *